Patented Nov. 17, 1931

1,832,418

UNITED STATES PATENT OFFICE

WILLIAM J. O'BRIEN, OF BALTIMORE, MARYLAND, ASSIGNOR TO THE GLIDDEN COMPANY, OF CLEVELAND, OHIO, A CORPORATION OF OHIO

PIGMENT

No Drawing.   Application filed February 1, 1928. Serial No. 251,226.

This application is a continuation-in-part of my application Ser. No. 195,148, filed May 28, 1927.

This invention relates to water paints and the preparation of pigments for making same.

Among the objects of this invention is the formation of a pigment to which when water is added will readily form therewith a water paint possessing superior whiteness and durability, in addition to lending itself readily to spray painting.

A more specific object of this invention is the preparation of a dry lithopone pigment which may be ground and sold in powdered form, ready to be mixed with water to form a water paint.

Other further and more specific objects of this invention will become readily apparent to persons skilled in the art from a consideration of the following description.

In the manufacture of water paints, agglutinants, such as casein, glue, etc., have been used with pigments such as whiting, clay, etc., or mixtures of same. I am not aware, however, of anyone having prepared a dry lithopone pigment which on addition of water thereto will form a water paint having the desired properties of covering and adhering to a surface upon which it is applied. I have found that by incorporating certain salts of alginic acid with lithopone, by the method to be described later on, I obtain a white, viscous product which can be dried, ground and sold in powdered form. When it is desired to form a water paint, this pigment is added to a suitable quantity of water forming a viscous composition that can be readily brushed out upon a wall or other surface.

A specific example of carrying out my invention is as follows: A solution of a salt of alginic acid (preferably the ammonium salt) in warm or hot water is added to a warm, slurry of lithopone in water containing about 40–50% solids. In order to effect thorough mixing of the materials, I may use either a ball mixer or a tank provided with a high speed agitator for vigorously stirring the mass. Owing to the slimy condition of the alginate, the resulting mixture cannot be filtered advantageously. The mixture is therefore dried directly by suitable means such as a steam drum drier or spray drier. The dried lithopone is dry-ground, and then may be packed in suitable containers for sale as a dry pigment.

The salt of alginic acid is generally obtained commercially in the form of a tough gel containing about 10% of the alginate salt. It may be dissolved in hot water, preferably with agitation. In the preferred method of preparation the amount of this gel used is approximately 3% of the weight of the lithopone so that the salt of alginic acid present in the dry pigment is about 0.3% of the weight of lithopone. The quantity of gel may be varied from 0.1% to 10% to produce beneficial results in the pigment, thus producing dry lithopone pigment having a content of alginate from 0.01% to 1%.

The alginates may also be obtained commercially in dry powdered form, containing much less water.

The preferred salt of alginic acid is the ammonium salt but other salts such as the sodium, potassium, magnesium, calcium and zinc salts of alginic acid may be employed. Mixtures of two or more of these salts may be used as well as the double salts, for example the double magnesium and zinc salt of alginic acid and the double ammonium and zinc salt of alginic acid.

The action of the alginates and lithopone in water may be explained as follows: The salts of alginic acid in water solution when poured out upon a surface and dried produce a continuous, tough, weather-resisting film, which is very elastic and can be used as a wrapper for packages. When mixed with pigment it is assumed that the particle of pigment is coated with the alginate salt, so that when spread out on a surface and allowed to dry a film is obtained with the pigment in suspension.

I have found that on addition of water to this pigment the alginate dissolves, thus imparting a somewhat viscous property to the mass, which when applied as a paint upon wood or plaster surfaces, yields a coating which is very adherent and possesses a beautiful white finish. This coating will not peel or crack and is quite permanent and resistant to acids which ordinarily discolor pigments ground in oil vehicles. This lithopone paint in addition to its superior whiteness and covering capacity, will not turn yellow on the walls, and possesses distinct advantages as a water color paint which may also be readily applied by spray painting because of its great covering powers and lower viscosity compared to that of oil paints. This water color paint also forms a smooth continuous film.

My process finds suitable application for the treatment of other pigments besides lithopone, examples of the other pigments being white lead, whiting, iron reds, titanium pigments, blanc fixe ground barytes, etc.

The present invention is not limited to the specific details set forth in the foregoing examples which should be construed as illustrative and not by way of limitation and in view of the numerous modifications which may be effected therein without departing from the spirit and scope of this invention, it is desired that only such limitations be imposed as are indicated in the appended claim.

I claim as my invention:

In an article of manufacture, a dry pigment comprising finely divided particles of lithopone individually coated with a salt of alginic acid, the salt of alginic acid forming from 0.01 to 1% by weight of the particles.

In testimony whereof I affix my signature.

WILLIAM J. O'BRIEN.